US010694488B2

(12) United States Patent
Hartley

(10) Patent No.: US 10,694,488 B2
(45) Date of Patent: Jun. 23, 2020

(54) DEVICE LOCATION DETECTION FOR ENHANCED DEVICE CONNECTION FOR VEHICLES

(71) Applicant: GM GLOBAL TECHNOLOGY OPERATIONS LLC, Detroit, MI (US)

(72) Inventor: Steven Hartley, Pointe-Claire (CA)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 0 days.

(21) Appl. No.: 16/131,854

(22) Filed: Sep. 14, 2018

(65) Prior Publication Data

US 2020/0092837 A1 Mar. 19, 2020

(51) Int. Cl.
*H04W 64/00* (2009.01)
*H04W 76/10* (2018.01)
*H04W 4/40* (2018.01)
*H04W 4/48* (2018.01)
*H04M 1/60* (2006.01)
*H04W 4/80* (2018.01)

(52) U.S. Cl.
CPC ....... *H04W 64/003* (2013.01); *H04M 1/6083* (2013.01); *H04W 4/40* (2018.02); *H04W 4/48* (2018.02); *H04W 76/10* (2018.02); *H04W 4/80* (2018.02)

(58) Field of Classification Search
CPC ......... H04W 4/046; H04W 4/40; H04W 4/80; H04W 4/48; H04W 12/06; H04W 12/08; H04W 4/44; H04W 4/42; H04M 1/6091; H04M 1/6075; H04M 1/6083; H04M 2250/02; B60R 2325/101; H04L 2209/84
See application file for complete search history.

(56) References Cited

U.S. PATENT DOCUMENTS

| | | | | |
|---|---|---|---|---|
| 8,606,335 | B2* | 12/2013 | Ozaki | H04M 1/2745 455/569.2 |
| 8,750,832 | B2* | 6/2014 | Wuergler | H04W 76/10 455/411 |
| 9,894,492 | B1* | 2/2018 | Elangovan | H01Q 1/3241 |
| 2014/0316781 | A1* | 10/2014 | Jang | H04M 1/6075 704/235 |
| 2017/0093536 | A1* | 3/2017 | Yoganathan | H04W 4/48 |
| 2017/0201928 | A1* | 7/2017 | Kang | H04W 40/244 |
| 2019/0047511 | A1* | 2/2019 | Link, II | B60R 25/24 |

* cited by examiner

*Primary Examiner* — Nam T Huynh
(74) *Attorney, Agent, or Firm* — Lorenz & Kopf, LLP

(57) ABSTRACT

Control systems and methods are provided for vehicles that include, in one embodiment, a plurality of sensors, and a processor. The plurality of sensors are dispersed across a body of the vehicle, and are configured to detect an electronic device in proximity to the vehicle; and collect sensor data with respect to the electronic device. The processor is configured to determine, using the sensor data, whether the electronic device is physically disposed inside the vehicle; and selectively connect the electronic device with a telematics unit of the vehicle, via the processor, based on whether the electronic device is physically disposed inside the vehicle.

20 Claims, 4 Drawing Sheets

DEVICE LOCATION DETECTION FOR ENHANCED DEVICE CONNECTION FOR VEHICLES

TECHNICAL FIELD

The technical field generally relates to vehicles, and more particularly relates to connecting of electronic devices with telematics units of vehicles.

Certain vehicles today have telematics units that can connect with electronic devices of one or more users. However, telematics units may connect with electronic devices when connection may not be desired in certain circumstances when the electronic device is physically disposed outside the vehicle. However, it may be desirable to improve the connection of electronic devices with vehicle telematics units in certain circumstances.

Accordingly, it may be desirable to provide improved methods and systems for connecting electronic devices with vehicle telematics units. Furthermore, other desirable features and characteristics of the present invention will become apparent from the subsequent detailed description of the invention and the appended claims, taken in conjunction with the accompanying drawings and this background of the invention.

SUMMARY

In an exemplary embodiment, a method is provided that includes: detecting an electronic device in proximity to a vehicle; collecting sensor data with respect to the electronic device via a plurality of sensors onboard the vehicle; determining, via a processor using the sensor data collected from the plurality of sensors onboard the vehicle, whether the electronic device is physically disposed inside the vehicle; and selectively connecting the electronic device with a telematics unit of the vehicle, via the processor, based on whether the electronic device is physically disposed inside the vehicle.

Also in one embodiment, the detecting of the electronic device includes detecting the electronic device via the plurality of sensors dispersed throughout a body of the vehicle; and the collecting of the sensor data includes collecting the sensor data with respect to the electronic device via the plurality of sensors dispersed throughout the vehicle.

Also in one embodiment, the method further includes determining whether the electronic device is recognized with respect to a known user of the vehicle; and wherein the selectively connecting the electronic device includes selectively connecting the electronic device with the telematics unit of the vehicle, provided that both of the following conditions are satisfied; namely, that: the electronic device is recognized with respect to the known user of the vehicle; and the electronic device is physically disposed inside the vehicle.

Also in one embodiment, the electronic device includes a smart phone of a user of the vehicle.

Also in one embodiment, the method further includes providing hands free telephone calls for the smart phone, via the telematics unit of the vehicle, based on whether the smart phone is physically disposed inside a passenger cabin of the vehicle Also in one embodiment, the method further includes providing telephone book services pertaining to a call history and contacts for the user of the smart phone, via the telematics unit of the vehicle, based on whether the smart phone is physically disposed inside a passenger cabin of the vehicle.

Also in one embodiment, the method further includes providing voice recognition services for messages of the smart phone, via the telematics unit of the vehicle, based on whether the smart phone is physically disposed inside a passenger cabin of the vehicle.

Also in one embodiment, the method further includes providing music playback for the smart phone, via the telematics unit of the vehicle, based on whether the smart phone is physically disposed inside a passenger cabin of the vehicle.

In another exemplary embodiment, a control system is provided for a vehicle, that includes: a sensing module configured to detect an electronic device in proximity to a vehicle via a plurality of sensors onboard the vehicle; and collect sensor data with respect to the electronic device via the plurality of sensors; and a processing module configured to determine, via a processor using the sensor data, whether the electronic device is physically disposed inside the vehicle; and selectively connect the electronic device with a telematics unit of the vehicle, via the processor, based on whether the electronic device is physically disposed inside the vehicle.

Also in one embodiment, the processing module is configured to: determine whether the electronic device is recognized with respect to a known user of the vehicle; and selectively connect the electronic device with the telematics unit of the vehicle, provided that both of the following conditions are satisfied; namely, that the electronic device is recognized with respect to the known user of the vehicle; and the electronic device is physically disposed inside the vehicle.

Also in one embodiment, the electronic device includes a smart phone of a user of the vehicle; and the processing module is configured to provide hands free telephone calls for the smart phone, via the telematics unit of the vehicle, based on whether the smart phone is physically disposed inside a passenger cabin of the vehicle.

Also in one embodiment, the electronic device includes a smart phone of a user of the vehicle; and the processing module is configured to provide telephone book services pertaining to a call history and contacts for the user of the smart phone, via the telematics unit of the vehicle, based on whether the smart phone is physically disposed inside a passenger cabin of the vehicle.

Also in one embodiment, the electronic device includes a smart phone of a user of the vehicle; and the processing module is configured to provide voice recognition services for messages of the smart phone, via the telematics unit of the vehicle, based on whether the smart phone is physically disposed inside a passenger cabin of the vehicle.

Also in one embodiment, the electronic device includes a smart phone of a user of the vehicle; and the processing module is configured to provide music playback for the smart phone, via the telematics unit of the vehicle, based on whether the smart phone is physically disposed inside a passenger cabin of the vehicle.

In another exemplary embodiment, a vehicle is provided that includes a body, a plurality of sensors, and a processor. The plurality of sensors are dispersed across the body, and are configured to detect an electronic device in proximity to the vehicle; and collect sensor data with respect to the electronic device. The processor is configured to determine, using the sensor data, whether the electronic device is physically disposed inside the vehicle; and selectively connect the electronic device with a telematics unit of the vehicle, via the processor, based on whether the electronic device is physically disposed inside the vehicle.

Also in one embodiment, the processor is configured to determine whether the electronic device is recognized with respect to a known user of the vehicle; and selectively connect the electronic device with the telematics unit of the vehicle, provided that both of the following conditions are satisfied; namely, that the electronic device is recognized with respect to the known user of the vehicle; and the electronic device is physically disposed inside the vehicle.

Also in one embodiment, the electronic device includes a smart phone of a user of the vehicle; and the processor is configured to provide hands free telephone calls for the smart phone, via the telematics unit of the vehicle, based on whether the smart phone is physically disposed inside a passenger cabin of the vehicle.

Also in one embodiment, the electronic device includes a smart phone of a user of the vehicle; and the processor is configured to provide telephone book services pertaining to a call history and contacts for the user of the smart phone, via the telematics unit of the vehicle, based on whether the smart phone is physically disposed inside a passenger cabin of the vehicle.

Also in one embodiment, the electronic device includes a smart phone of a user of the vehicle; and the processor is configured to provide voice recognition services for messages of the smart phone, via the telematics unit of the vehicle, based on whether the smart phone is physically disposed inside a passenger cabin of the vehicle.

Also in one embodiment, the electronic device includes a smart phone of a user of the vehicle; and the processor is configured to provide music playback for the smart phone, via the telematics unit of the vehicle, based on whether the smart phone is physically disposed inside a passenger cabin of the vehicle.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
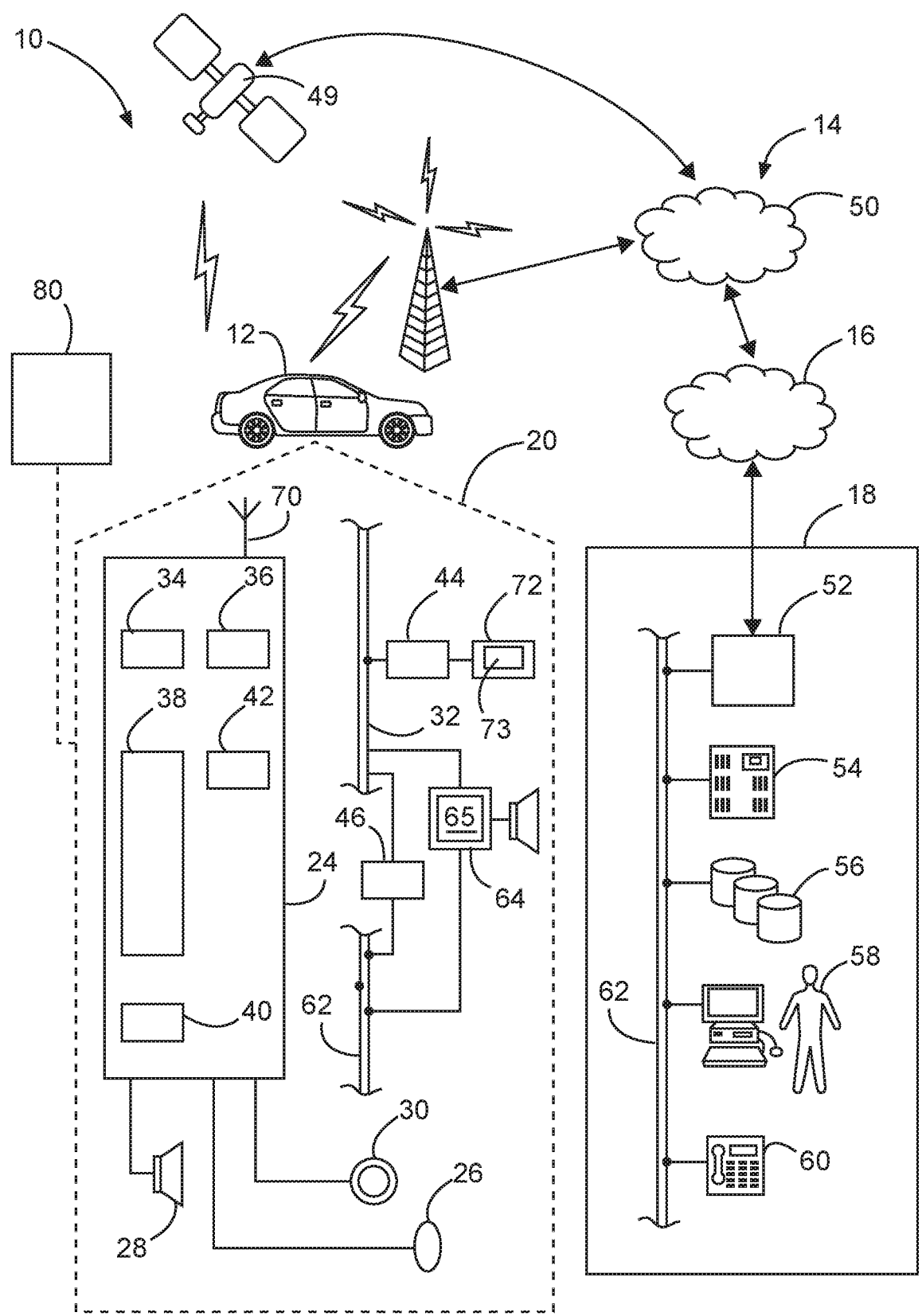
FIG. 1 is a functional block diagram of a communications system that includes a vehicle that is configured to selectively connect with electronic devices of users of the vehicle, in accordance with exemplary embodiments.

FIG. 1 is a functional block diagram of a communications system 10, in accordance with an exemplary embodiment. As described in greater detail further below, the communications system 10 includes a vehicle 12 that is configured to selectively connect with user electronic devices, in accordance with exemplary embodiments.

As depicted in FIG. 1, the communications system 10 generally includes a vehicle 12, one or more wireless carrier systems 14, one or more land networks 16, and one or more remote servers 18. It should be appreciated that the overall architecture, setup and operation, as well as the individual components of the illustrated system are merely exemplary and that differently configured communications systems may also be utilized to implement the examples of the method disclosed herein. Thus, the following paragraphs, which provide a brief overview of the illustrated communications system 10, are not intended to be limiting.

The vehicle 12 may be any type of mobile vehicle such as a motorcycle, car, truck, recreational vehicle (RV), boat, plane, farm equipment, or the like, and is equipped with suitable hardware and software that enables it to communicate over communications system 10. As shown in FIG. 1, in various embodiments the vehicle hardware 20 is disposed within a body 19 of the vehicle 12, and includes a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media-oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the remote server 18, and generally includes an electronic processing device (processor) 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within electronic processing device 38.

In various embodiments, the telematics unit 24 can be an embedded/installed within the vehicle 12 at the time of manufacture, or may be an aftermarket unit that is installed after manufacture of the vehicle 12. In various embodiments, the telematics unit 24 enables voice and/or data communications over one or more wireless networks (e.g., wireless carrier system 14), and/or via wireless networking, thereby allowing communications with the remote server 18 and/or other vehicles and/or systems.

In various embodiments, the telematics unit 24 may use radio transmissions to establish a voice and/or data channel with the wireless carrier system 14 so that both voice and data transmissions can be sent and received over the voice and/or data channels. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), and the like. In one embodiment, dual mode antenna 70 services the GPS chipset/component 42 and the cellular chipset/component 34. In various embodiments, the telematics unit 24 utilizes cellular communication according to industry standards, such as LTE, 5G, or the like. In addition, in various embodiments, the telematics unit 24 carries out wireless networking between the vehicle 12 and one or more other network devices, for example using one or more wireless protocols such as one or more IEEE 802.11 protocols, WiMAX, or Bluetooth.

The telematics unit 24 may offer a number of different services for users of the vehicle 12, including the connection with electronic devices 80 of users of the vehicle 12. In various embodiments, the electronic devices may include, by way of example, various consumer electronic/mobile devices, such as a smart phone, a laptop, a smart wearable device, a tablet computer, a network computer, and/or one or more other electronic devices and/or combinations thereof.

In various embodiments, the telematics unit 24 pairs/links with the one or more electronic devices 80 while connected to a wireless network within a wireless range of the vehicle 12. In various embodiments, the telematics unit 24 and each electronic device 80 exchange data (either directly and/or indirectly via the remote server 18) in order to verify that the electronic device 80 is a known device prior to the telematics unit's 24 connecting with (and/or sharing data with) the electronic device 80. For example, in various embodiments, the vehicle 12 sends beacons on a periodic basis that are dispersed throughout the vehicle 12 (e.g., throughout the body 19 thereof). In various embodiments, once the electronic device 80 is sufficiently close to the vehicle 12, the electronic device 80 transmits a message indicating that it is close to the vehicle 12, and the vehicle 12 and the electronic device 80 commence communications.

Also in various embodiments, the remote server 18 may initiate and/or participate in the pairing of the telematics unit 24 and the electronic device 80, for example by obtaining a unique identifier of the electronic device 80 and/or verifying the owner or user of the electronic device 80 as being the same as and/or associated with an owner or user of the vehicle 12.

In various embodiments, one or more short-range wireless connection (SRWC) protocols (e.g., Bluetooth/Bluetooth Low Energy, or Wi-Fi) may be utilized. In various embodiments, once the SRWC is established, the electronic devices 80 may be become bonded and/or recognized as network participants for the telematics unit 24, for example for current uses as well as in the future. For example, in certain embodiments, when the electronic device 80 is subsequently in wireless range with the telematics unit 24 after the initial pairing, telematics unit 24 (and/or the remote server 18) may confirm that the electronic device 80 is recognized as already being paired or established as a network participant for communicating with the telematics unit 24 and receiving services therefrom.

In various embodiments, the telematics unit 24 provides various services for the recognized electronic devices 80. In various embodiments, such services may include, among other possible services: (i) hands free telephone calls; (ii) telephone book (e.g., looking up the users' call history and contacts); (iii) text/voice recognition (e.g., including audio playback of the users' messages), and (iv) music playback (e.g. using speakers 28 in the vehicle 12). In various embodiments, the telematics unit 24 provides connection to the recognized electronic devices 80, and services for the electronic devices 80 such as those described above, only for electronic devices 80 that are disposed inside the vehicle 12, for example to help avoid unwanted inadvertent connections with electronic devices 80 which may not be presently located inside the vehicle 12 (e.g., for electronic devices 80 already being operated by a user who is presently in a nearby building and/or outdoor area in proximity to, but not inside, the vehicle 12).

In addition, in various embodiments, the telematics unit 24 may also provide other services, such as, by way of example: turn-by-turn directions and other navigation-related services provided in conjunction with the GPS chipset/component 42; emergency assistance services, information requests from the users of the vehicle 12 (e.g., regarding points of interest en route while the vehicle 12 is travelling), and/or infotainment-related services, for example in which music, internet web pages, movies, television programs, videogames, and/or other content are downloaded by an infotainment center 46 that may be part of the telematics unit 24 and/or operatively connected to the telematics unit 24 via vehicle bus 32 and audio bus 22, among various other types of possible services.

With respect to other electronic components utilized in connection with the telematics unit 24, the microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and remote server 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with remote server 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22. In various embodiments, the audio component 64 includes radio system 65 (which also includes antenna 70, as well as amplifiers, speakers, and the like, in certain embodiments).

Vehicle sensors 72, connected to various sensor interface modules 44 are operatively connected to the vehicle bus 32. Example vehicle sensors include but are not limited to gyroscopes, accelerometers, magnetometers, emission detection, and/or control sensors, and the like. Example sensor interface modules 44 include powertrain control, climate control, and body control, to name but a few.

Figure 2:
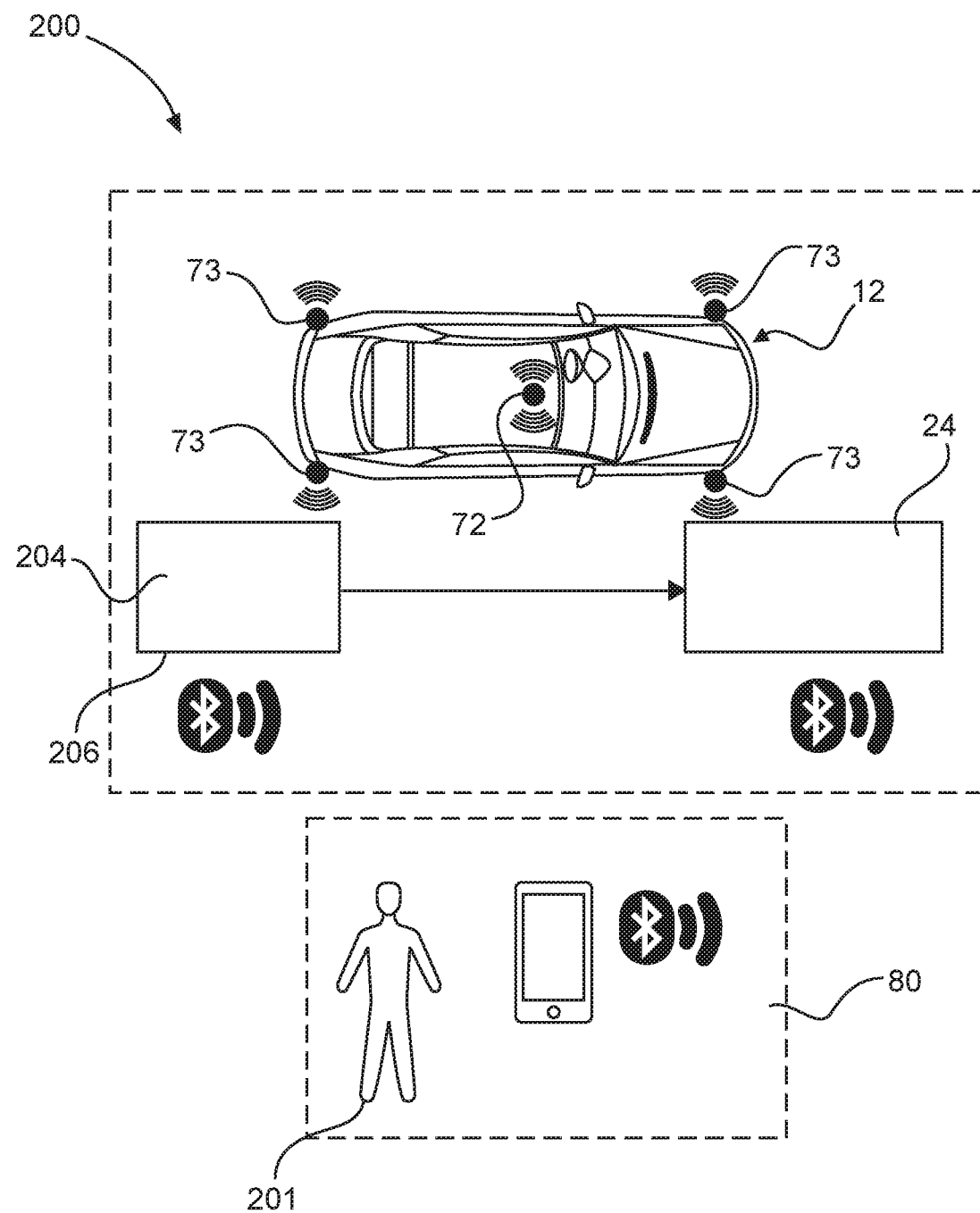
FIG. 2 is a diagram of certain components of a control system for selectively connecting with user electronic devices with the vehicle, and that can be implemented in connection with the communications system, including the vehicle thereof, of FIG. 1, in accordance with exemplary embodiments.

In various embodiments, vehicle sensors 72 include a plurality of Bluetooth low energy (BLE) sensors 73. In various embodiments, the BLE sensors 73 are dispersed throughout the vehicle 12, for example on top of a roof of the vehicle 12 as well as in various corners of the body 19 of the vehicle 12 (including a front driver side corner, a front passenger side corner, a rear driver side corner, and a rear passenger side corner, for example as depicted in FIG. 2, described further below). Also in various embodiments, the BLE sensors 73 help to detect whether one or more electronic devices 80 of users of the vehicle 12 are disposed inside the vehicle 12 (for use in selective pairing of electronic devices 80 that are disposed inside the vehicle 12, as discussed above), along with other communications with the electronic devices 80. In certain embodiments, the sensors 73 comprise a number of BLE beacons that are placed in various locations in the vehicle 12. For example, in certain embodiments, the more BLE beacons are in the vehicle 12, the more accurate location information can be obtained. Also in various embodiments, an application on the mobile device 80 is configured to detect the sensors 73 and collect an RSSI (receiver signal strength indicator) for the sensors 73, and transmit them to the virtual key module 302, which then determines based on the signal where the mobile device 80 is with respect to the vehicle 12 (and, including, whether the mobile device 80 is physically disposed within a passenger cabin of the vehicle 12).

The wireless carrier systems 14 may be any number of cellular telephone systems, satellite-based wireless systems, and/or any other suitable wireless systems, for example that transmits signals between the vehicle hardware 20 and land network 16 (and/or, in certain embodiments, that communicate directly with the vehicle 12 and/or the remote server 18). According to certain examples, wireless carrier system 14 may include and/or be coupled to one or more cell towers 48, satellites 49, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14.

The land network 16 can be a conventional land-based telecommunications network that is connected to one or more landline telephones, and that connects wireless carrier system 14 to remote server 18. For example, the land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

The remote server 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing.

The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a remote server 18 that is manned, it will be appreciated that the remote server 18 can be any central or remote facility, manned or unmanned, mobile or fixed, to or from which it is desirable to exchange voice and data.

With reference to FIG. 2, a diagram is provided of certain components of a control system 200 for selectively connecting user electronic devices with the vehicle, in accordance with exemplary embodiments. In various embodiments, the control system 200 can be implemented in connection with the communications system 10, including the vehicle 12 thereof, of FIG. 1.

As depicted in FIG. 2, the vehicle 12 is configured, via the control system 200, to selectively connect with one or more electronic devices 80 that are owned and/or utilized by one or more drivers, passengers, or other users 201 of the vehicle 12. In various embodiments, the selective connection with the electronic device 80 is based both on a known identification of the electronic device 80 (e.g., based on previous pairing with the electronic device 80, ownership identification or related information, and so on) as well as whether or not the electronic device 80 is presently disposed inside the vehicle 12.

As depicted in FIG. 2, in various embodiments, various BLE sensors 73 (discussed above with respect to FIG. 1) are dispersed throughout the vehicle 12. In various embodiments, the BLE sensors 73 provide beacons, in conjunction with a passive entry/passive start (PEPS) system 204 for the vehicle 12, for identifying and communicating with the electronic device 80. For example, as depicted in FIG. 2 and noted above, in certain embodiments, the BLE sensors 73 are located on top of a roof of the vehicle 12 as well as in various corners of the vehicle 12, including a front driver side corner, a front passenger side corner, a rear driver side corner, and a rear passenger side corner of the vehicle 12.

Also in various embodiments, the BLE sensors 73 provide information to the PEPS system 204 as to the identification of the electronic device 80 (e.g., as to whether the electronic device 80 is associated with a known driver, passenger, and/or other user 201 of the vehicle 12) as well as to whether the electronic device 80 is presently disposed inside the vehicle 12. In various embodiments, these determinations are made by one or more processors 206 of the PEPS system 204, and/or one or more embedded processors of the BLE sensors 73. Also in various embodiments, the determinations are shared with the telematics unit 24 for use in selectively connecting (e.g., pairing) of the vehicle 12 (e.g., via the telematics unit 24) with the electronic device 80. In various embodiments, as noted above, the telematics unit 24 will connect with the electronic device 80 if, and only if, both (i) the electronic device 80 is both identified as a recognized device (e.g., based on previous pairing with the electronic device 80, ownership identification or related information, and so on); and (ii) the electronic device 80 is determined to be presently disposed inside the vehicle 12.

Figure 3:
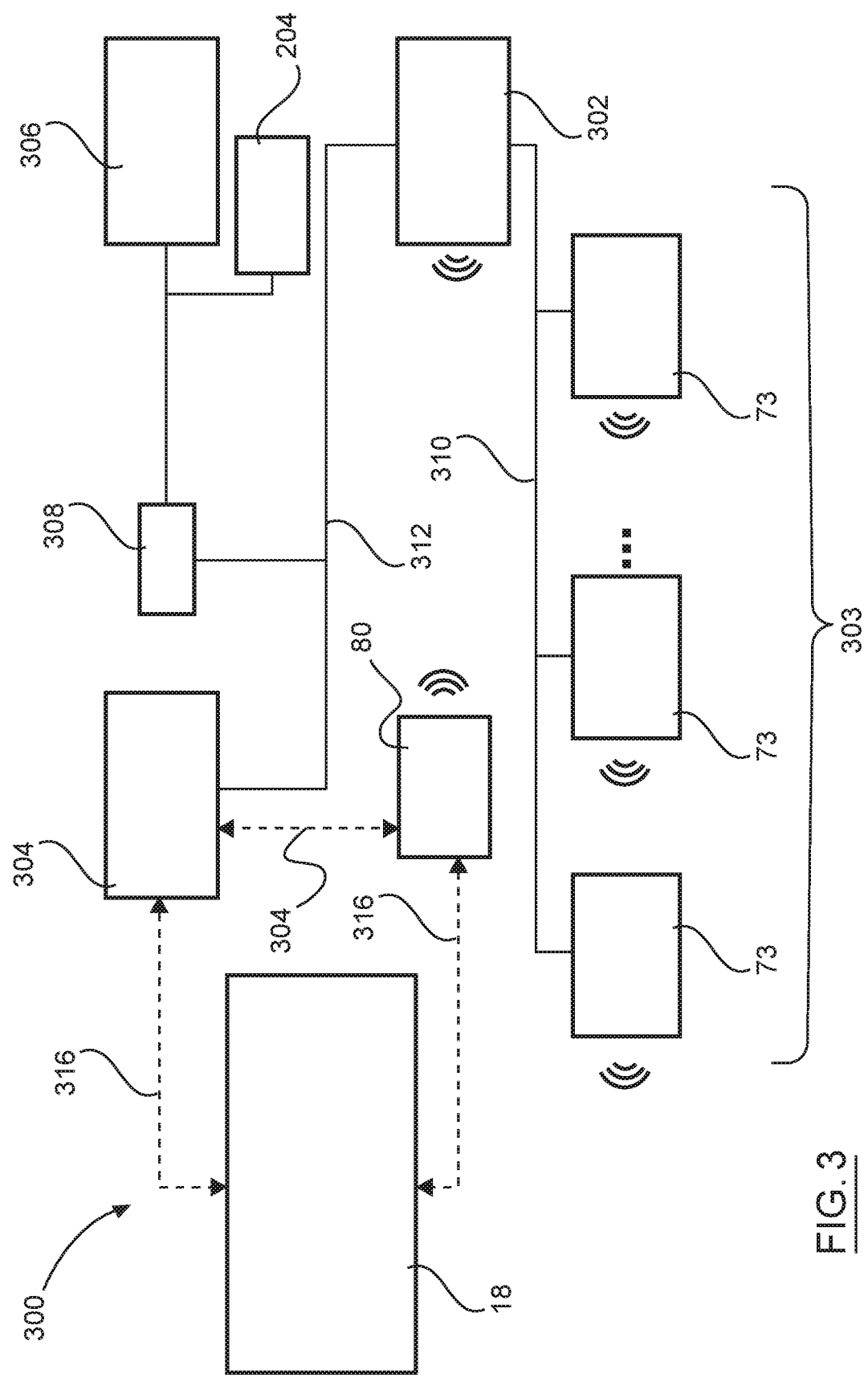
FIG. 3 is a functional block diagram including certain modules of the control system of FIG. 2, in accordance with exemplary embodiments.

FIG. 3 is a functional block diagram including certain modules of the control system 200 of FIG. 2, in accordance with exemplary embodiments. In accordance with various embodiments, the control system 200, including certain modules thereof, is depicted in connection with communications with an exemplary electronic device 80 of FIGS. 1 and 2 and remote server 18 of FIG. 1.

As depicted in FIG. 3, in various embodiments, a virtual key module (VKM) 302 is coupled to a sensor module 303, which utilizes various BLE sensors 73. As indicated in FIG. 3, the control system 200 may include any number of BLE sensors 73 on the vehicle 12, for example throughout the vehicle 12 as depicted in FIG. 2 and described above. Also, in various embodiments, the VKM 302 communicates with the BLE sensors 73 via a communications link 310, such as a short range wireless network and/or vehicle bus, in various embodiments. In certain embodiments, the VKM 302 includes a processor for determining whether the electronic device 80 is presently disposed inside the vehicle 12 (e.g., inside a passenger cabin of the vehicle 12), as well as whether the electronic device 80 is recognized as being associated with a user of the vehicle 12, for example based on sensor data obtained from the BLE sensors 73.

Also in various embodiments, a telematics module 304 is in communications with the VKM 302 via a communications link 312 (e.g., a vehicle CAN bus, in certain embodiments). In certain embodiments, the telematics module 304 corresponds to and/or is implemented in connection with the telematics unit 24 of FIG. 1. In various embodiments, the telematics module 304 (e.g., via the processor 38 of the telematics unit 24 of FIG. 2) selectively connects with the electronic device 80 based on information obtained via the VKM 302, including whether the electronic device 80 is presently disposed inside the vehicle 12 (e.g., inside a passenger cabin of the vehicle 12), as well as whether the electronic device 80 is recognized as being associated with a user of the vehicle 12. In various embodiments, the telematics module 304 (via the telematics unit 24, including the processor 38 thereof) performs these functions in accordance with steps of the process 400 of FIG. 4. In various embodiments, the telematics module 304, VKM 302, and/or one or more other components of the control system 200 comprise one or more processing modules for performing such functions in accordance with the steps of the process 400 of FIG. 4, described below.

Also as depicted in FIG. 3, in various embodiments, the telematics module 304 also communicates directly with the electronic device 80 and/or the remote server 18 via one or more respective wireless connections and/or networks 314, 316. For example, in certain embodiments, the telematics module 304 may communicate (via the telematics unit 24) via the electronic device 80 via a first wireless network 314 (e.g., a short range wireless network), and with the remote server 18 via a second wireless network 316 (e.g., a long range wireless network, such as a cellular and/or satellite-based network). In certain embodiments, the telematics module 304 may (e.g., via the telematics unit 24) obtain information directly from the electronic device 80 (e.g., as to its identification). Also in certain embodiments, the remote server 18 may facilitate identification and/or recognition of the electronic device 80, for example, by communicating between the electronic device 80 and telematics module 304 and checking the identification of the electronic device 80 with records in one or more databases of the remote server 18, and so on.

In addition, in various embodiments, the telematics module 304 and the VKM 302 also communicate with the PEPS system 204 of FIG. 2, as well as a body control module (BCM) 306 and center stack module (CSM) 308 of the vehicle 12 via the communications link 312 (e.g., the vehicle CAN bus). In various embodiments, the PEPS system 204 utilizes information from the VKM 302 (e.g., as to whether the electronic device 80 is detected and is recognized as being associated with a user of the vehicle 12) in allowing the user to unlock the vehicle 12, open one or more vehicle 12 doors, and/or start the vehicle 12 using the electronic device 80 and/or one or more other user devices (e.g., a user's keyfob). Also in various embodiments, the BCM 306 and/or CSM 308 may also utilize the information from the VKM 302 in selectively operating, and/or allowing operation of, various vehicle functionality (e.g., including user requests for activating climate control features and/or other features of the vehicle 12).

Figure 4:
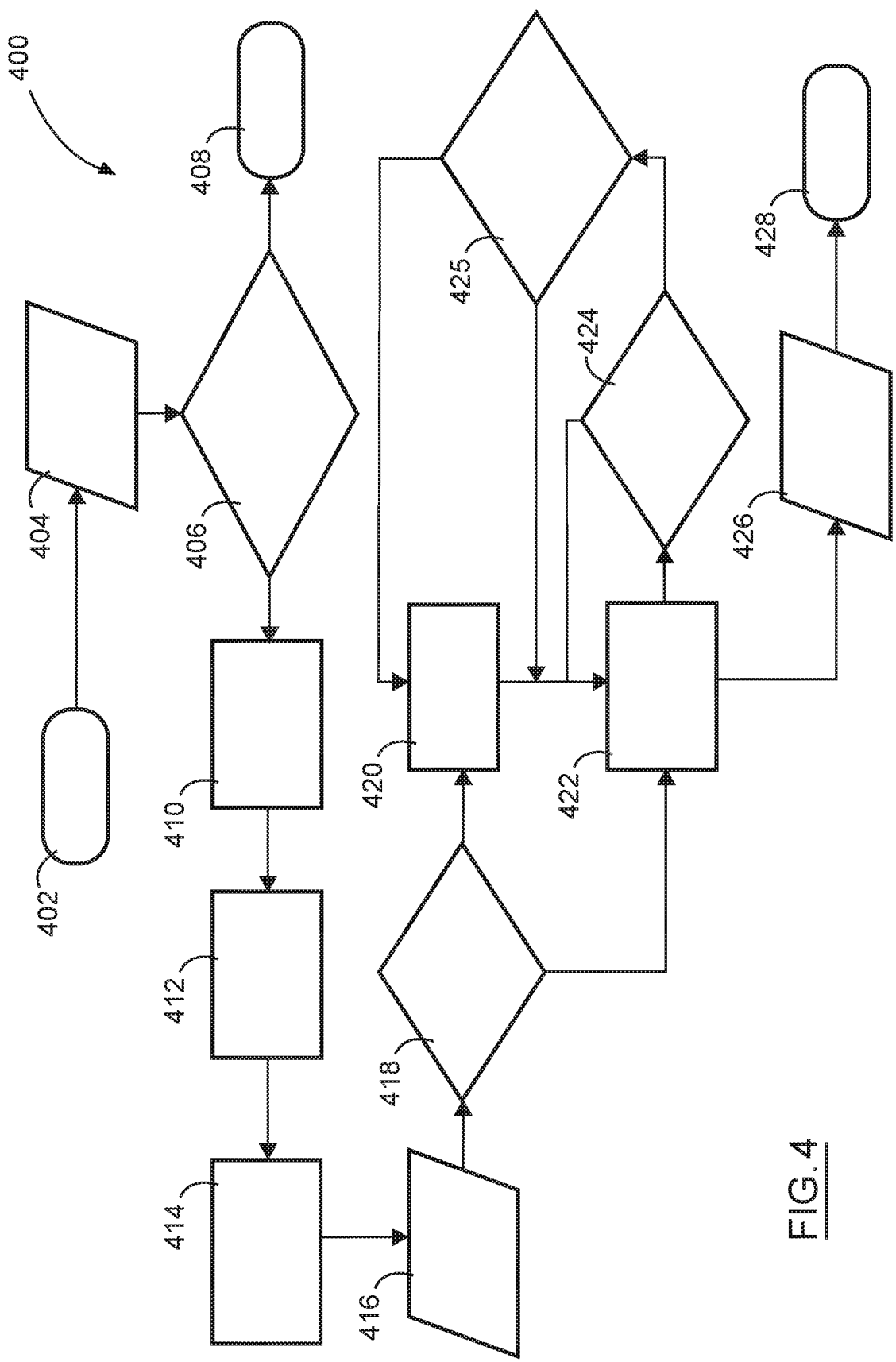
FIG. 4 is a flowchart of a process for selectively connecting user electronic devices with a vehicle, and that can be used in connection with the communications system of FIG. 1, including the vehicle thereof, and the control system of FIGS. 2 and 3, in accordance with exemplary embodiment.

FIG. 4 is a flowchart of a process 400 for selectively connecting user electronic devices with a vehicle, in accordance with various embodiments. In various embodiments, the process 400 can be used in connection with the communications system 10 of FIG. 1, including the vehicle 12 thereof, and the control system 200 of FIGS. 2 and 3, and components thereof, in accordance with exemplary embodiment.

As depicted in FIG. 4, in various embodiments the process 400 begins at step 402. In certain embodiments, the process 400 begins when an electronic device 80 is detected in proximity to the vehicle 12, and/or when one or more users of the vehicle 12 (e.g., user 201 of FIG. 2) approaches or enters the vehicle 12, or turns on the vehicle 12 and/or an ignition therefor (e.g. by turning a key, engaging a keyfob or start button, and so on). In certain embodiments, the the steps of the process 400 are performed continuously during operation of the vehicle 12.

In various embodiments, an electronic device is detected at 404. In various embodiments, one or more BLE sensors 73 of FIGS. 1-3 detect one or more electronic devices 80 (e.g., smart phone, tablet, computer, wearable device, or the like) in proximity to and/or approaching the vehicle.

Also in various embodiments, a determination is made at 404 as to whether the detected electronic device is recognized by the vehicle 12. In certain embodiments, a determination is made as to whether the electronic device has unlocked one or more doors, systems, and/or other features of the vehicle 12. Also in certain embodiments, a determination is made as to whether the electronic device has an identification that is recognized as pertaining to a known user of the vehicle. In various embodiments, the determination(s) of 404 are made by one or more processors and/or processing modules of the vehicle 12, such as via one or more processors of or associated with the telematics unit 24, PEPS system 204, and/or VKM 302 of the vehicle 12. In certain embodiments, such determination(s) may also be made, in whole or in part, via one or more processors of the remote server 18.

In various embodiments, if the electronic device is determined to have not been recognized by the vehicle 12 (e.g., in certain embodiments, if the electronic device has not unlocked the vehicle 12 and/or does not have an identification that is associated with a known user of the vehicle 12), then the process terminates at 408.

Conversely, also in various embodiments, if the electronic device is determined to have been recognized by the vehicle 12 (e.g., in certain embodiments, if the electronic device has unlocked the vehicle 12 and/or has an identification that is associated with a known user of the vehicle 12), then location information is collected with respect to the electronic device, at 410. Specifically, in various embodiments, the BLE sensors 73 collect information as to the location of the electronic device 80 with respect to the vehicle 12.

Also in various embodiments, the telematics unit 24 is woken up at 412. In various embodiments, the telematics unit 24 is woken up, activated, or turned on via instructions provided thereto by one or more processors and/or processing modules, such as those of or related to the PEPS system 204, VKM 302, and/or the remote server 18. In certain embodiments, a portion of the telematics unit 24, for example, pertaining to infotainment functions, is woken up at 412. In other embodiments, the entire telematics unit 24 is woken up at 412.

In certain embodiments, one or more messages are transmitted at 414. In certain embodiments, the telematics unit 24 provides one or more messages along communications link 312 (e.g., a vehicle CAN bus) requesting additional information regarding the electronic device 80. In certain embodiments, such messages may also be transmitted via the PEPS system 204 and/or the VKM 302. Accordingly, in various embodiments, one or more messages are sent to the telematics unit 24 from the VKM 302 in order to inform the telematics unit 24 where the electronic device 80 (e.g., the detected smart phone or other device) is physically located.

Also in certain embodiments, device location information is received at 416. In certain embodiments, the telematics unit 24 receives information regarding the location of the electronic device 80, for example as collected via the BLE sensors 73. In certain embodiments, such location information may be obtained, provided, and/or facilitated by the PEPS system 204 and/or the VKM 302.

In various embodiments, a determination is made at 418 as to whether the electronic device 80 is presently located inside the vehicle 12. In certain embodiments, a processor of the telematics unit 24 makes this determination as to whether the electronic device 80 is physically disposed within a passenger cabin of the vehicle 12, based on data collected via the BLE sensors 73. In various other embodiments, a processor of the telematics unit 24 determines whether the electronic device 80 is physically disposed within the passenger cabin of the vehicle 12 based on the location of the electronic device 80 as determined by the PEPS system 204 and/or the VKM 302 based on the sensor data obtained from the BLE sensors 73.

In various embodiments, if the electronic device 80 is determined to be disposed inside the vehicle 12 (e.g., inside a passenger cabin of the vehicle 12), then the electronic device 80 is paired (or connected) at 420. In various embodiments, the electronic device 80 is paired, or connected, with the telematics unit 24 of the vehicle 12. Also in various embodiments, the telematics unit 24 thereafter provides various services in connection with the electronic device 80, such as (i) hands free telephone calls; (ii) telephone book (e.g., looking up the users' call history and contacts); (iii) text/voice recognition (e.g., including audio playback of the users' messages), and (iv) music playback (e.g. using speakers 28 in the vehicle 12). Also in various embodiments, the process 400 also proceeds to step 422 (described further below), in which searching is conducted for additional electronic devices (while the electronic device 80 described above remains connected, or paired, in various embodiments).

Conversely, also in various embodiments, if the electronic device 80 is determined to not be disposed inside the vehicle 12 (e.g., to not be inside a passenger cabin of the vehicle 12), then the electronic device 80 is not paired (or connected). Instead, the process proceeds directly to the above-mentioned step 422. Instead, without pairing (or connecting with) the first detected electronic device 80, the vehicle 12 would search for additional electronic devices.

In various embodiments, a determination is made at 424 as to whether any additional electronic devices have been found and recognized. In certain embodiments, a processor of the telematics unit 24 makes this determination, based on subsequent data collected via the BLE sensors 73.

In various embodiments, if it is determined that one or more other electronic devices are found and recognized, then a determination is made at 425 as to whether the additional electronic device is disposed inside the vehicle 12. In various embodiments, this determination is similar to step 418, described above. If it is determined that the other electronic device is disposed inside the vehicle 12, the other electronic device is paired, in step 420 (discussed above). Otherwise, if the other electronic device is not disposed inside the vehicle 12 as determined at 425, or if it is determined at 424 that there are no other detected electronic devices, then the process returns instead to the above-referenced step 422. In various embodiments, the searching at 422 continues until a determination is made at 426 that no further searching is required (e.g., if one or more processors noted above determines that the vehicle 12 is no longer operating, or that the search is completed, or that there is no need for further searching), after which the process 400 terminates at 428.

Accordingly, methods and system are provided for selecting connecting user electronic devices with vehicles 12. In various embodiments, the user electronic device is connected only if the electronic device is recognized as being associated with a user of the vehicle, and only on the further condition that the electronic device is presently disposed inside the vehicle 12 (e.g., within a cabin of the vehicle 12). In various embodiments, this prevents unwanted connection of the telematics unit 24 of the vehicle 12 with electronic devices 80 of users 201 that may not be presently disposed inside the vehicle 12. For example, if a first user is engaged in a telephone call or other activity using his or her electronic device outside of the vehicle 12 (e.g., either outdoors or in a nearby building), then this first user will be able to maintain privacy by not having the telematics unit 24 automatically connect to the first user's call or other activity with a second user that may be inside the vehicle 12, and so on.

It will be appreciated that the systems and methods may vary from those depicted in the Figures and described herein. For example, the communications system of FIG. 1, including the remote server, the vehicles, communications networks, and/or components thereof, may vary from that depicted in FIG. 1 and/or described herein, in various embodiments. It will similarly be appreciated that the control system of FIGS. 2 and 3, and/or various components thereof, may vary from the depictions in FIGS. 2 and 3 and the accompanying descriptions. It will also be appreciated that the process (and/or subprocesses) disclosed herein may differ from those described herein and/or depicted in FIG. 4, and/or that steps thereof may be performed simultaneously and/or in a different order as described herein and/or depicted in FIG. 4, among other possible variations.

While at least one example has been presented in the foregoing detailed description, it should be appreciated that a vast number of variations exist. It should also be appreciated that the example or examples are only examples, and are not intended to limit the scope, applicability, or configuration of the disclosure in any way. Rather, the foregoing detailed description will provide those skilled in the art with a convenient road map for implementing the example or examples. It should be understood that various changes can be made in the function and arrangement of elements without departing from the scope of the appended claims and the legal equivalents thereof.

What is claimed is:

1. A method comprising:
   detecting an electronic device in proximity to a vehicle, the electronic device associated with a known user of the vehicle;
   collecting sensor data with respect to the electronic device via a plurality of sensors onboard the vehicle;
   determining, via a processor using the sensor data collected from the plurality of sensors onboard the vehicle, whether the electronic device is physically disposed inside the vehicle; and
   selectively connecting the electronic device with a telematics unit of the vehicle, via the processor, based on whether the electronic device is physically disposed inside the vehicle, wherein the step of selectively connecting the electronic device comprises:
      connecting the electronic device with the telematics unit when the electronic device is detected in proximity to the vehicle and is determined to be physically disposed inside the vehicle; and
      not connecting the electronic device with the telematics unit when the electronic device is detected in proximity to the vehicle and is determined to not be physically disposed inside the vehicle, wherein the step of not connecting the electronic device comprises preventing connection with a known electronic device when the known electronic device is not physically disposed inside the vehicle.

2. The method of claim 1, wherein:
   the detecting of the electronic device comprises detecting the electronic device via the plurality of sensors dispersed throughout a body of the vehicle, including in multiple corners of the vehicle; and
   the collecting of the sensor data comprises collecting the sensor data with respect to the electronic device via the plurality of sensors dispersed throughout the vehicle.

3. The method of claim 2, wherein:
   the detecting of the electronic device comprises detecting the electronic device via the plurality of sensors dispersed throughout the body of the vehicle, including a roof of the vehicle, a front driver side corner, a front passenger side corner, and a rear passenger side corner of the vehicle.

4. The method of claim 1, further comprising:
   determining whether the electronic device is recognized with respect to the known user of the vehicle;
   wherein the selectively connecting the electronic device comprises selectively connecting the electronic device with the telematics unit of the vehicle, provided that both of the following conditions are satisfied; namely, that:
      the electronic device is recognized with respect to the known user of the vehicle; and
      the electronic device is physically disposed inside the vehicle; and
   wherein the electronic device is not connected if the electronic device is disposed physically outside the vehicle, even if the electronic device is recognized with respect to the known user of the vehicle.

5. The method of claim 1, wherein the electronic device comprises a smart phone of the known user of the vehicle.

6. The method of claim 5, further comprising:
   providing hands free telephone calls for the smart phone, via the telematics unit of the vehicle, based on whether the smart phone is physically disposed inside a passenger cabin of the vehicle, wherein the step of providing the hands free telephone calls comprises:
      providing hands free telephone calls for the smart phone, when the smart phone is detected in proximity to the vehicle and is determined to be physically disposed inside the passenger cabin of the vehicle; and
      not providing hands free telephone calls for the smart phone, when the smart phone is detected in proximity to the vehicle and is determined to not be physically disposed inside the passenger cabin of the vehicle;
   wherein hands free telephone calls are not provided for the smart phone if the smart phone is disposed physically outside the vehicle, even if the smart phone is recognized with respect to the known user of the vehicle.

7. The method of claim 5, further comprising:
   providing telephone book services pertaining to a call history and contacts for the known user of the smart phone, via the telematics unit of the vehicle, based on whether the smart phone is physically disposed inside a passenger cabin of the vehicle;
   wherein the telephone book services are not provided for the smart phone if the smart phone is disposed physically outside the vehicle, even if the smart phone is recognized with respect to the known user of the vehicle.

8. The method of claim 5, further comprising:
   providing voice recognition services for messages of the smart phone, via the telematics unit of the vehicle, based on whether the smart phone is physically disposed inside a passenger cabin of the vehicle;
   wherein the voice recognition services are not provided for the smart phone if the smart phone is disposed physically outside the vehicle, even if the smart phone is recognized with respect to the known user of the vehicle.

9. The method of claim 5, further comprising:
   providing music playback for the smart phone, via the telematics unit of the vehicle, based on whether the smart phone is physically disposed inside a passenger cabin of the vehicle;
   wherein the music playback is not provided for the smart phone if the smart phone is disposed physically outside the vehicle, even if the smart phone is recognized with respect to the known user of the vehicle.

10. The method of claim 1, wherein:
    the detecting comprises detecting of a plurality of known electronic devices in proximity to the vehicle, each of the plurality of known electronic devices associated with a respective known user of the vehicle;
    the collecting comprises collecting sensor data with respect to the plurality of known electronic devices via the plurality of sensors onboard the vehicle;

the determining comprises determining, via the processor using the sensor data collected from the plurality of sensors onboard the vehicle, whether each of the plurality of known electronic devices is physically disposed inside the vehicle; and the selective connecting comprises:
- connecting a first known electronic device of the plurality of known electronic devices that is determined to be physically disposed inside the vehicle; and
- preventing connection with a second known electronic device of the plurality of known electronic devices that is determined to be not physically disposed inside the vehicle.

11. A control system for a vehicle, the control system comprising:
- a plurality of sensors disposed onboard the vehicle and configured to:
  - detect an electronic device in proximity to the vehicle, the electronic device associated with a known user of the vehicle; and
  - collect sensor data with respect to the electronic device; and
- a processor configured to:
  - determine, via a processor using the sensor data, whether the electronic device is physically disposed inside the vehicle; and
  - selectively connect the electronic device with a telematics unit of the vehicle, via the processor, based on whether the electronic device is physically disposed inside the vehicle, by:
    - connecting the electronic device with the telematics unit when the electronic device is detected in proximity to the vehicle and is determined to be physically disposed inside the vehicle; and
    - not connecting the electronic device with the telematics unit when the electronic device is detected in proximity to the vehicle and is determined to not be physically disposed inside the vehicle, including by preventing connection with a known electronic device when the known electronic device is not physically disposed inside the vehicle.

12. The control system of claim 11, wherein:
the plurality of sensors are configured to:
- detect a plurality of known electronic devices in proximity to the vehicle, each of the plurality of known electronic devices associated with a respective known user of the vehicle; and
- collect sensor data with respect to the plurality of known electronic devices via the plurality of sensors onboard the vehicle; and the processor is configured to:
- determine, using the sensor data collected from the plurality of sensors onboard the vehicle, whether each of the plurality of known electronic devices is physically disposed inside the vehicle;
- connect a first known electronic device of the plurality of known electronic devices that is determined to be physically disposed inside the vehicle; and
- prevent connection with a second known electronic device of the plurality of known electronic devices that is determined to be not physically disposed inside the vehicle.

13. A vehicle comprising:
- a body;
- a plurality of sensors dispersed across the body and configured to:
  - detect an electronic device in proximity to the vehicle, the electronic device associated with a known user of the vehicle; and
  - collect sensor data with respect to the electronic device; and
- a processor configured to:
  - determine, using the sensor data, whether the electronic device is physically disposed inside the vehicle; and
  - selectively connect the electronic device with a telematics unit of the vehicle, via the processor, based on whether the electronic device is physically disposed inside the vehicle, by:
    - connecting the electronic device with the telematics unit when the electronic device is detected in proximity to the vehicle and is determined to be physically disposed inside the vehicle; and
    - not connecting the electronic device with the telematics unit when the electronic device is detected in proximity to the vehicle and is determined to not be physically disposed inside the vehicle, including by preventing connection with a known electronic device when the known electronic device is not physically disposed inside the vehicle.

14. The vehicle of claim 13, wherein the processor is configured to:
- determine whether the electronic device is recognized with respect to the known user of the vehicle; and
- selectively connect the electronic device with the telematics unit of the vehicle, provided that both of the following conditions are satisfied; namely, that:
  - the electronic device is recognized with respect to the known user of the vehicle; and
  - the electronic device is physically disposed inside the vehicle;
  - wherein the electronic device is not connected if the electronic device is disposed physically outside the vehicle, even if the electronic device is recognized with respect to the known user of the vehicle.

15. The vehicle of claim 13, wherein:
the electronic device comprises a smart phone of the known user of the vehicle; and
the processor is configured to provide hands free telephone calls for the smart phone, via the telematics unit of the vehicle, based on whether the smart phone is physically disposed inside a passenger cabin of the vehicle, by:
- providing hands free telephone calls for the smart phone, when the smart phone is detected in proximity to the vehicle and is determined to be physically disposed inside the passenger cabin of the vehicle; and
- not providing hands free telephone calls for the smart phone, when the smart phone is detected in proximity to the vehicle and is determined to not be physically disposed inside the passenger cabin of the vehicle;
- wherein hands free telephone calls are not provided for the smart phone if the smart phone is disposed physically outside the vehicle, even if the smart phone is recognized with respect to the known user of the vehicle.

16. The vehicle of claim 13, wherein:

the electronic device comprises a smart phone of the known user of the vehicle; and the processor is configured to provide telephone book services pertaining to a call history and contacts for the user of the smart phone, via the telematics unit of the vehicle, based on whether the smart phone is physically disposed inside a passenger cabin of the vehicle;

wherein the telephone book services are not provided for the smart phone if the smart phone is disposed physically outside the vehicle, even if the smart phone is recognized with respect to the known user of the vehicle.

17. The vehicle of claim 13, wherein:

the electronic device comprises a smart phone of the known user of the vehicle; and the processor is configured to provide voice recognition services for messages of the smart phone, via the telematics unit of the vehicle, based on whether the smart phone is physically disposed inside a passenger cabin of the vehicle;

wherein the voice recognition services are not provided for the smart phone if the smart phone is disposed physically outside the vehicle, even if the smart phone is recognized with respect to the known user of the vehicle.

18. The vehicle of claim 13, wherein:

the electronic device comprises a smart phone of the known user of the vehicle; and the processor is configured to provide music playback for the smart phone, via the telematics unit of the vehicle, based on whether the smart phone is physically disposed inside a passenger cabin of the vehicle;

wherein the music playback is not provided for the smart phone if the smart phone is disposed physically outside the vehicle, even if the smart phone is recognized with respect to the known user of the vehicle.

19. The vehicle of claim 13, wherein the plurality of sensors comprise a plurality of BLE sensors that are dispersed throughout the body of the vehicle, including a roof, a front driver side corner, a front passenger side corner, and a rear passenger side corner of the vehicle.

20. The vehicle of claim 13, wherein:

the plurality of sensors are configured to:

detect a plurality of known electronic devices in proximity to the vehicle, each of the plurality of known electronic devices associated with a respective known user of the vehicle; and collect sensor data with respect to the plurality of known electronic devices via the plurality of sensors onboard the vehicle; and the processor is configured to:

determine, using the sensor data collected from the plurality of sensors onboard the vehicle, whether each of the plurality of known electronic devices is physically disposed inside the vehicle;

connect a first known electronic device of the plurality of known electronic devices that is determined to be physically disposed inside the vehicle; and prevent connection with a second known electronic device of the plurality of known electronic devices that is determined to be not physically disposed inside the vehicle.

\* \* \* \* \*